March 24, 1931.   C. F. BEZPALEC   1,797,816
TIRE PATCH CONTAINER LID
Filed July 1, 1929   2 Sheets-Sheet 1
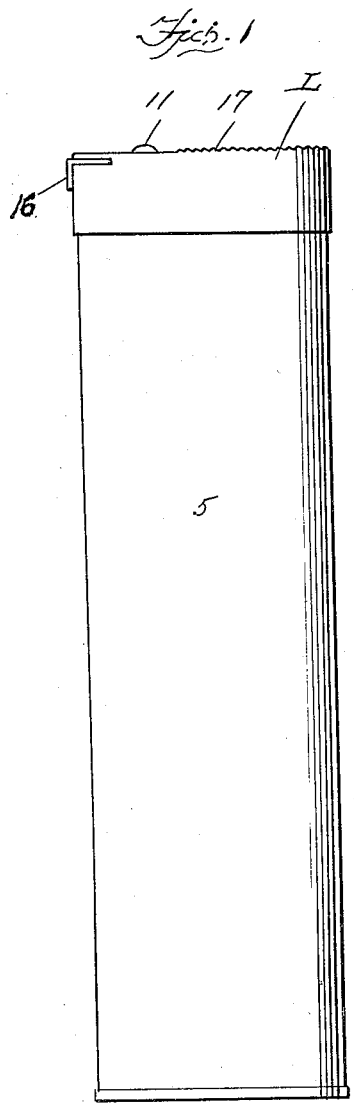
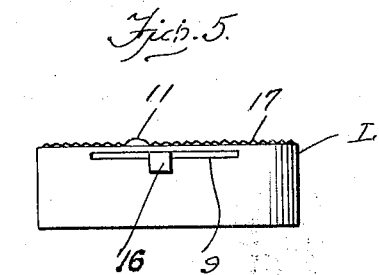
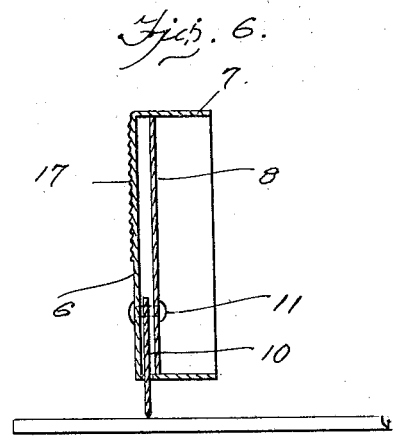
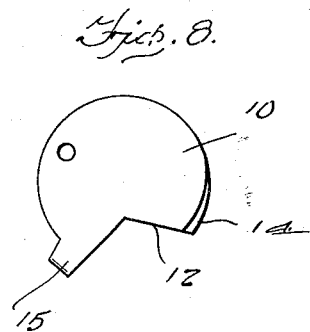
Inventor
Chas. F. Bezpalec
By Clarence A. O'Brien
Attorney March 24, 1931. C. F. BEZPALEC 1,797,816
TIRE PATCH CONTAINER LID
Filed July 1, 1929 2 Sheets-Sheet 2
Fig. 2.
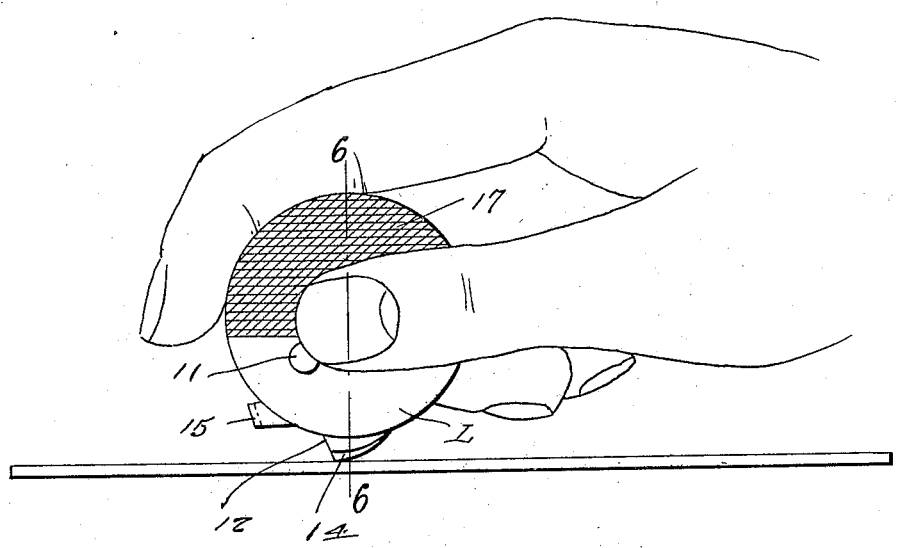
Fig. 4. Fig. 3.
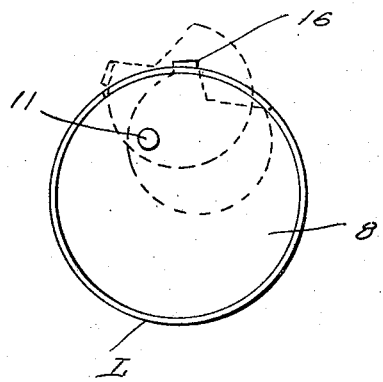 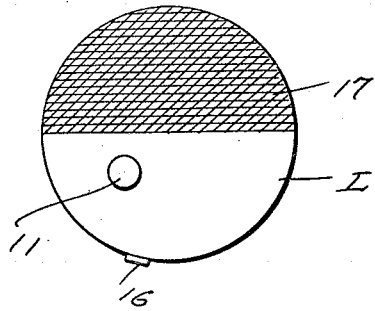
Fig. 7.
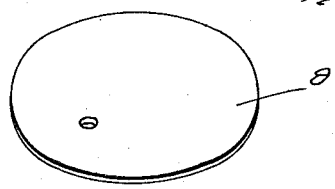
Inventor
Chas. F. Bezpalec
By Clarence A. O'Brien
Attorney Patented Mar. 24, 1931

1,797,816

UNITED STATES PATENT OFFICE

CHARLES F. BEZPALEC, OF CRETE, NEBRASKA

TIRE-PATCH-CONTAINER LID

Application filed July 1, 1929. Serial No. 375,098.

The present invention relates to a lid for tire patch containers and has for its prime object to provide a lid having a cutting element incorporated therein.

Another very important object of the invention resides in the provision of a lid of this nature wherein the cutting element is pivotally mounted so that the same may be swung in and out of the lid and may be handily used when desired.

A still further very important object of the invention resides in the provision of a lid of this nature which is exceedingly simple in its construction, inexpensive to manufacture, thoroughly efficient and reliable in use and operation, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawing:

Figure 1 is a side elevation of a container showing my improved lid thereon,

Figure 2 is a side elevation of the lid showing the same in use,

Figure 3 is a top plan view of the lid,

Figure 4 is a bottom plan view thereof,

Figure 5 is a side elevation of the lid,

Figure 6 is a vertical section through the lid taken substantially on the line 6—6 of Figure 2, Figure 7 is a perspective view of the partition in the lid, and Figure 8 is a plan view of the cutter.

Referring to the drawing in detail it will be seen that the numeral 5 denotes an ordinary cylindrical container and the letter L denotes generally the lid therefor. My improvement resides in this lid which comprises a top 6 with a cylindrical skirt 7 adapted to telescope over the upper end of the container 5.

A disk like partition 8 is disposed in the skirt 7 in parallelism with the top 6. The skirt 7 is formed between the top 6 and the partition 8 on one side with a slot 9. A segmental disk like cutter 10 is pivoted adjacent its periphery by means of a rivet, pin or the like, 11 between the top 6 and the partition 8 so that it may be swung in and out of the slot 9.

A notch 12 is formed in the periphery of this cutter 10 and the periphery has a knife edge 14 adjacent one end of the notch while adjacent the other end of the notch is an outwardly projecting arm 15 terminating in a downwardly disposed lip 16 which abuts the skirt 7 when the disk is disposed inwardly while the arm abuts one end of the slot 9 when the cutter is disposed outwardly for cutting purposes as is clearly illustrated in Figure 2.

A portion of the upper face of the top 6 is serrated or roughened as is indicated at 17 for roughening the patch after the same has been cut by the cutter 10. It will be seen that the cutter may be easily swung in and out of the lid and when swung out of the lid may be used to advantage for cutting the patch to the proper size as is illustrated to advantage in Figure 2 and this may be done very easily and rapidly.

It is thought that the construction, operation and utility and advantages of this invention will now be quite apparent to those skilled in this art without a more detailed description thereof.

The present embodiment of the invention has been disclosed in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

A lid of the class described comprising a top with a cylindrical skirt extending therefrom, a partition in the skirt in parallelism with the top, said skirt being formed with a slot between the top and the partition, a cutter, means for pivotally mounting the cutter between the partition and the top to swing in and out through the slot, said cutter being of a segmental disk like formation and being pivoted adjacent its periphery and having formed in its periphery a notch, the periphery adjacent one end of the notch being sharpened, said disk being formed adjacent the other end of the notch with an extension disposed through the slot and engageable with one end of the slot to limit the outward movement of the cutter and having an angular lip at its extremity engageable with the skirt in a manner to limit the inward swinging movement of the cutter, said extension and lip constituting a handle for manually swinging the cutter.

In testimony whereof I affix my signature.

CHARLES F. BEZPALEC.